United States Patent [19]

Gillett et al.

[11] Patent Number: 4,868,732

[45] Date of Patent: Sep. 19, 1989

[54] PLUGGABLE POWER SYSTEM HAVING MAGNETIC FLUX COUPLED POWER TRANSFORMER AND INDUCTIVE FILTER COMPONENTS

[75] Inventors: John B. Gillett, Woodstock; James H. Spreen, Stone Ridge, both of N.Y.

[73] Assignee: International Business Machines Corporation, Armonk, N.Y.

[21] Appl. No.: 114,803

[22] Filed: Oct. 28, 1987

[51] Int. Cl.$^4$ .................... H02M 3/335; H01R 23/68
[52] U.S. Cl. ........................................ 363/90; 363/21; 363/45; 363/97; 336/216; 336/DIG 2; 361/413
[58] Field of Search ..................................... 363/18-21, 363/95, 97, 131, 146, 147, 45, 90; 361/322, 397, 413; 336/216, 217, DIG. 2

[56] References Cited

U.S. PATENT DOCUMENTS

| | | | |
|---|---|---|---|
| 1,490,031 | 4/1924 | Schmidt . | |
| 3,539,959 | 11/1970 | Wildi | 336/60 |
| 3,882,265 | 5/1975 | Johnston et al. | 174/88 B |
| 4,236,086 | 11/1980 | Hoebel | 336/DIG. 2 |
| 4,257,087 | 3/1981 | Cuk | 363/40 |
| 4,274,133 | 6/1981 | Cuk et al. | 363/39 |
| 4,292,665 | 9/1981 | Hersom et al. | 363/141 |
| 4,703,409 | 10/1987 | Spreen | 363/45 |
| 4,712,160 | 12/1987 | Sato et al. | 363/141 |

FOREIGN PATENT DOCUMENTS 54-155427 12/1979 Japan .

OTHER PUBLICATIONS

"Coupled Inductor Analysis and Design" S. Cuk and Z. Zhang, Proceedings of PESC 86, Jun. 23-27, 1986, Vancouver, Canada.
"A Low Voltage Schottky For High Efficiency V.L.S.I Power Supplies," B. Carsten & M. Chirea, PCI Oct. 1984 Proceedings, pp. 323-338.
IBM Technical Disclosure Bulletin, vol. 17, No. 2, Jul. 1974, pp. 492-493 "Security Device Power Source" P. Abramson and E. Lorschieder.
IBM Technical Disclosure Bulletin, vol. 29, No. 3, Aug. 1986, pp. 1071-1072 "Low Inductance Chip Connector for Power Rectifiers" J. Miraglia and J. Spreen.
"Flux Coupling for Wheelchair Battery Chargers" NASA Tech. Briefs, Spring 1985, vol. 9, No. 1, p. 43.

Primary Examiner—Patrick R. Salce
Assistant Examiner—Emanuel Todd Voeltz
Attorney, Agent, or Firm—Robert L. Troike; Frederick D. Poag

[57] ABSTRACT

A regulated voltage electrical power system has a driving section and a driven section. The driving section includes a power transformer primary structure and a ripple current carrying, driving winding of a filter system for the smoothed outputs circuits of the power system, each of which includes a single turn, driven filter winding magnetically coupled to the driving winding by a multi-path core structure. Each driven filter winding links that part of the multi-path structure which corresponds in cross-sectional area to the relative ripple voltage imposed by the power transformer on it. The power transformer secondaries for the outputs of the power system are also of a single turn each, differing output voltages being achieved by provision of differing number of primary winding turns associated with the various outputs. Planar diodes and core gap-filling ferrite inserts are provided in the secondary winding structures.

8 Claims, 9 Drawing Sheets

WITHDRAWN

ATTACHED TO SUPPLY

ATTACHED TO LOAD

PLANAR TRANSFORMER WITH EMBEDDED RECTIFIERS CONNECTED

D.C. BUS TO LOAD

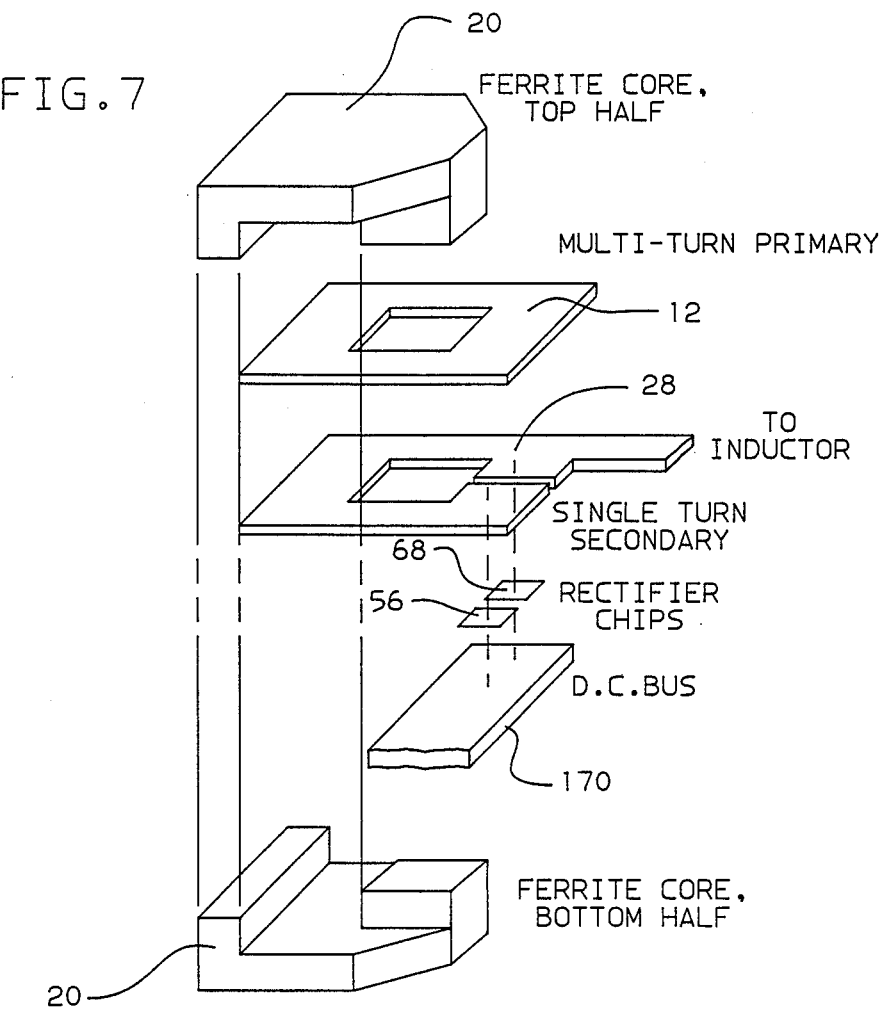
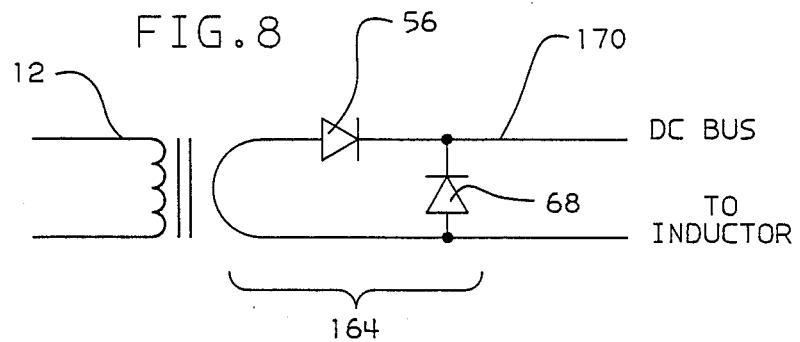

PLUGGABLE POWER SYSTEM HAVING MAGNETIC FLUX COUPLED POWER TRANSFORMER AND INDUCTIVE FILTER COMPONENTS

BACKGROUND OF INVENTION

1. Field of the Invention:

This invention relates to electrical power systems and more particularly to a power system having improved magnetic and other components which function to transfer power and to provide filtering interrelationships and at the same time act as connectors between halves of the system which are separable for maintenance and other purposes.

2. Prior Art:

Various power and filter systems having relatively movable, magnetically coupled windings have long been known, for both power transfer and filtering purposes. Examples are seen in rotatable secondary winding voltage regulating power transformers, variable coupling filtering devices, and in separable primary and secondary energy coupling devices. Examples of the aforedescribed filter and connector arrangements are seen in Schmidt U.S. Pat. No. 1,490,031 and an article published in the IBM Technical Disclosure Bulletin, Volume 17, No. 2 (July, 1974), pages 492–493.

Coupled inductor filter systems wherein a plurality of substantially "zero ripple" outputs can be provided in a transistor switching regulator are also known. Examples are seen in U.S. Pat. No. 4,703,409 to J. H. Spreen, one of the inventors herein, and assigned to the assignee of this application. This patent is incorporated herein by reference.

In large data processing systems, it is customary to provide a "machine frame" which carries power supply and regulating elements for energizing circuit cards which are plugged into the machine frame. In such cases, both power and logic signal connectors are engaged as the card is plugged into place. It has also been known to releasably connect the power supply subsystems themselves into the machine, so that such subsystems can be replaced as easily as a logic or memory circuit card might.

There exist, however, needs to optimize such relationships and provide even denser packaging of the subsystems and card arrays in large data processing systems.

SUMMARY OF THE INVENTION

Accordingly, it is a principle object of the invention to provide an improved system and components which enable separation of the system into two portions, one "pluggable" into the other.

It is another object of the invention to provide in a power system as aforesaid a division of primary and secondary elements, and ripple-bearing and ripple-free filter elements, whereby source parts of the system can be carried by the machine and load circuit parts can be carried by pluggable cards, with the main energy coupling between them being magnetic and contactless.

It is still another object of the invention to provide components having particular utility in the aforesaid system, among other uses.

It is yet another object of the invention to provide components as aforesaid which are adaptable to thin configuration so as to be mountable on closely packed circuit cards.

According to one aspect of the invention, there is provided a power system which comprises a card having a planar transformer secondary winding mounted thereon to provide power to the card by magnetic coupling without electrical contact, the card being inserted into complementary parts the magnetic circuit of a power transformer to complete the same.

According to another aspect of the invention, the card carries planar windings magnetically coupled to a filter winding structurally associated with the primary winding of the power transformer.

According to yet another aspect of the invention, driven filter inductor windings, which can be of one turn each, can be magnetically associated with a driving filter winding by a common magnetic core having a main portion carrying the driving winding and a plural magnetic flux path portion carrying the driven filter windings, with the cross-sectional areas of the paths being so related that single turn windings encircling one or more of the paths can have generated in them, by the flux they encircle, A.C. potentials which although a function of the same a.c. ripple currents carried by the driving winding, differ between themselves in proportion to the differing a.c. ripple potentials imposed on them. According to yet another aspect of the invention, the secondary circuit structures include planar rectifier and free-wheeling diode components within the respective secondary windings whereby inductance in the circuit loops of the secondary windings is minimized and the commutating action of the diodes is facilitated.

According to another aspect of the invention, primary and secondary portions of the power transformers, and driving and driven portions of the filter inductor optionally can have a lap joint relationship to each other, whereby in each case there is a simplified mechanical interface between the core elements of those portions.

The foregoing and other objects, aspects and advantages of the invention will be apparent from the following specification and from the drawings forming part thereof.

BRIEF DESCRIPTION OF THE DRAWINGS

FIG. 7 shows an exploded view of the parts shown schematically in FIGS. 5 and 6.

FIG. 8 is a fragmentary circuit diagram showing the electrical relationship of portions of the structure of FIG. 7.

DETAILED DESCRIPTION

Figure 1:
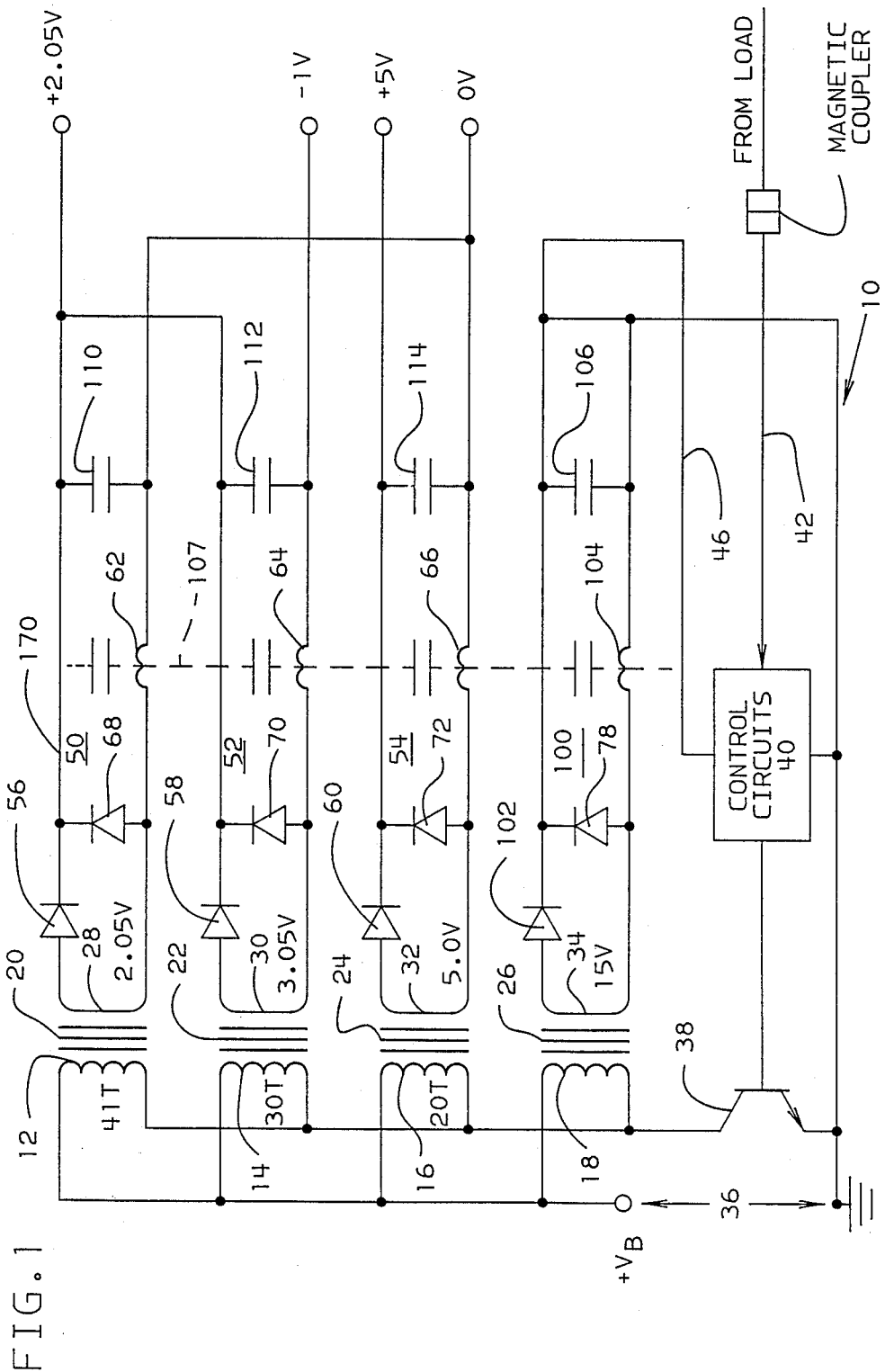
FIG. 1 is a simplified circuit diagram of a multi-level power supply having primary and secondary, and driving and driven, portions which are physically discrete but detachably juxtaposed for magnetic cooperation in accordance with the invention.

FIG. 1 shows a simplified schematic diagram of a power supply having primary drive circuits 10, a parallel array of primary windings 12, 14, 16, 18, power transformer cores 20, 22, 24, 26, and corresponding secondary windings 28, 30, 32, 34. The primary drive circuits 10 are conventional and a simple example is illustrated to include a D.C. bulk voltage supply 36, a transistor switch 38 in series with the parallel array of primary windings, and oscillator driven pulse width modulation control 40 responsive to a feedback signal on line 42 to vary the ON time of each cycle of operation of the switch 38 so as to maintain the output voltage sensed on line 42 at a desired level with respect to a reference voltage in circuit 40.

A group of the power output windings, in the illustrated embodiment, three of them numbered 28, 30 and 32, are each of a single turn and drive respective output circuits 50, 52, 54, each comprising a rectifier diode 56, 58, 60, an inductor 62, 64, 66, and a free-wheeling diode 68, 70, 72.

The remaining secondary circuit shown, circuit 100, comprises multiturn secondary 34, a rectifier 102, freewheeling diode 78, a filter inductor 104, and a filter capacitor 106. This circuit 100 provides power to the control circuit 40. The load imposed by the control circuits 40 is such that the current through the filter inductor 104 is continuous, although it has an A.C. ripple component. In accordance with the coupled inductor teachings of the aforecited U.S. Pat. No. 4,703,409, this ripple bearing inductor 104 is magnetically coupled with the other output inductors 62, 64, 66 as indicated at 107 in such manner that current in them is ripple-free. Accordingly, their output circuits 50, 52, 54 need have no output filter capacitors, but small capacitors 110, 112, 114 are provided to smooth less than perfect practical effects, such as slight dimensional imbalancing, switching noise, etc.

Figure 2:
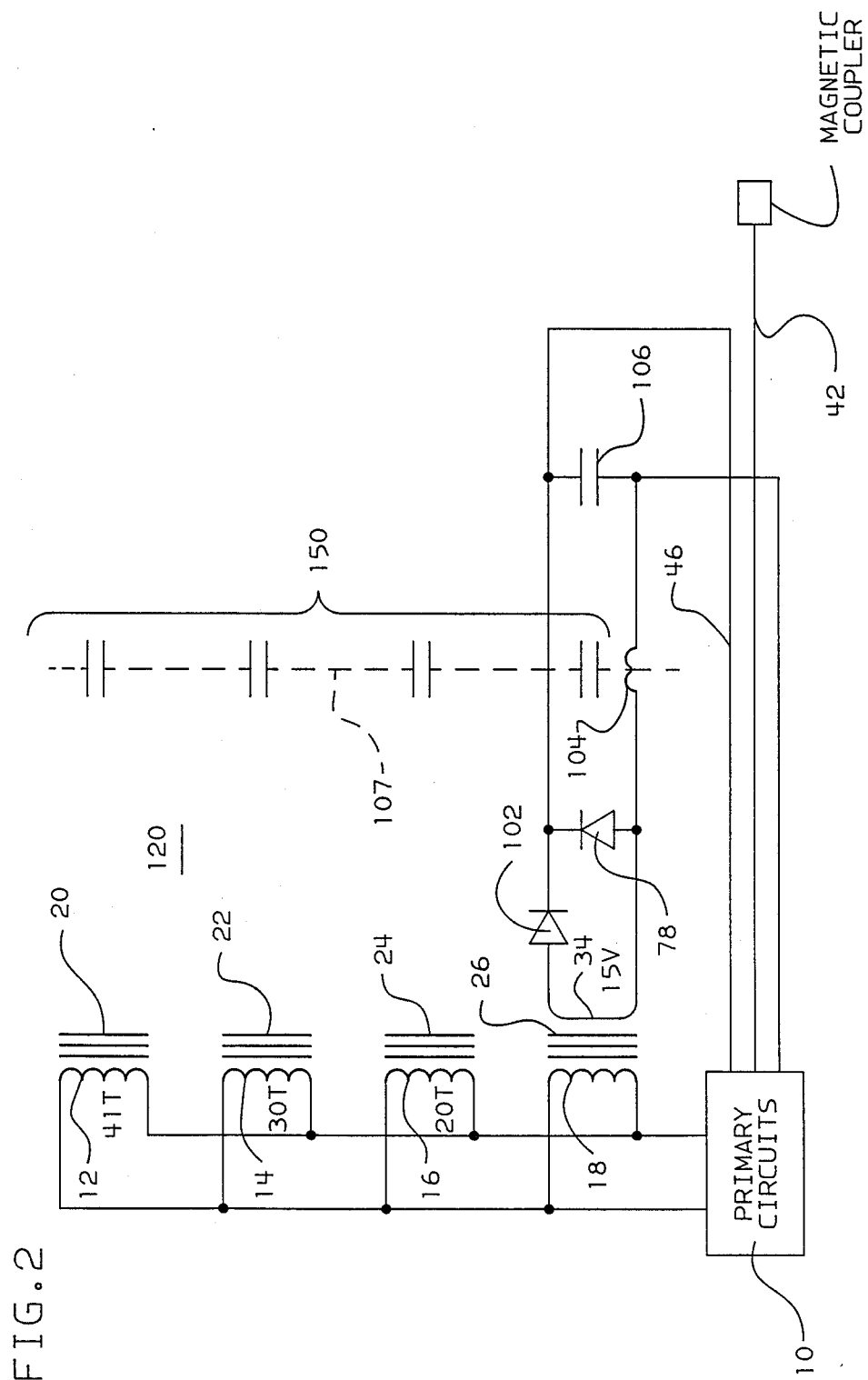
FIG. 2 shows a first subset of the elements of FIG. 1 which form one part of the two part organization of FIG. 1.
Figure 3:
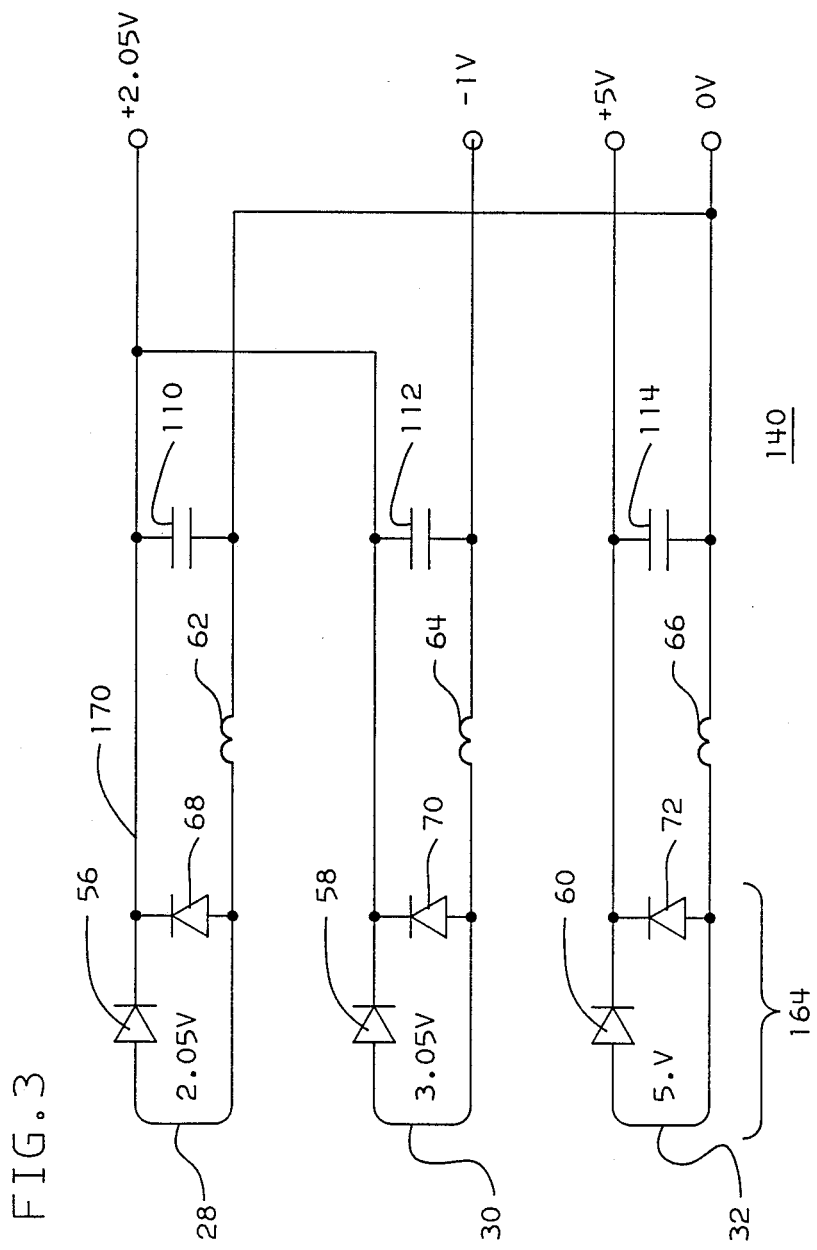
FIG. 3 shows a second subset of elements of FIG. 1 which cooperate in operation with the first subset but are separable therefrom as a discrete subassembly.

In accordance with the invention, the secondary structures 50, 52, 54 are separable from the remainder of the circuit thus far described, resulting in two complementary subset structures, 120 and 140. FIG. 2 shows subset 120 including most of the heavy and bulky elements and FIG. 3 shows the other subset 140. In use, subset 120 might be carried by a machine frame and subset 140 might be part of a circuit card pluggable into the machine frame as will be described.

In one of the preferred embodiments of the invention, the "tongue and groove" structure, most of the core structure 150 linking the inductors 62, 64, 66, and 104 stays with the subset 120, as shown in FIG. 2. This contributes to minimization of bulk and weight in the other subset 140, FIG. 3.

From the foregoing, it is seen that the organization of FIGS. 1-3 provides a replaceable circuit package, which may be either the base portion 120 or the card portion 140 which can be operated with no conductor-to-conductor mechanical contacts for electrical power connections. Power is supplied to the card 160, FIG. 4, by a link of time-varying magnetic flux.

The functional card 160 incorporates the secondary transformer windings and rectification/filter functions 140 of an appropriate switched-mode power supply/regulator, in addition to the operational circuits normally found on a functional card. Placing the card in its slot in the machine assembles the transformers and an inductor by positioning the secondary windings 28, 30, 32 in the power transformer cores 20, 22, 24, and positioning the filter inductor windings 62, 64, 66 into the inductor core structure 150.

Figure 5:
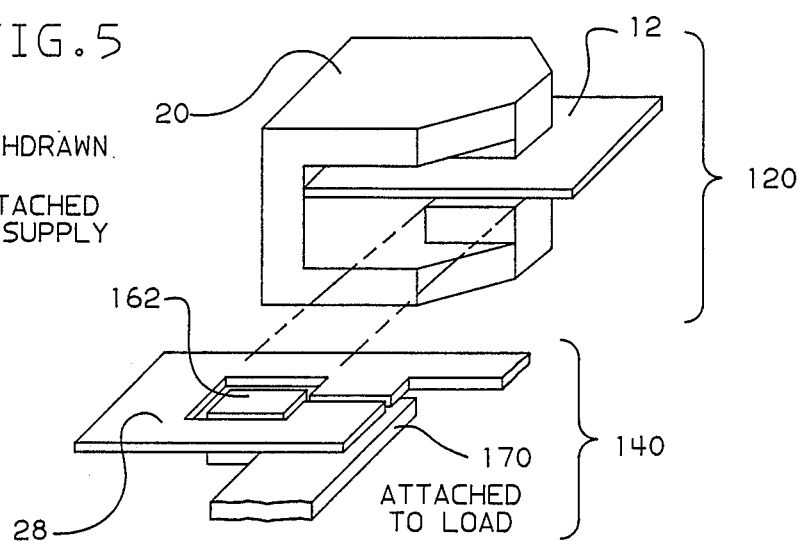
FIG. 5 shows a detail, on an enlarged scale, of portions of the elements shown in FIG. 4, the parts being shown in FIGS. 4 and 5 in a card withdrawn state.
Figure 6:
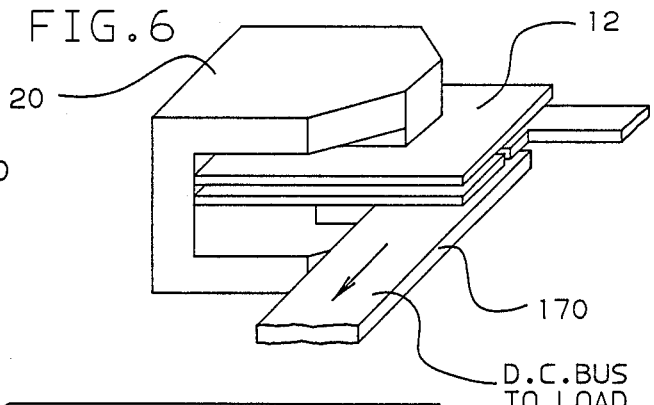
FIG. 6 shows the parts shown in 5, but in a connected juxtaposition.

The planar geometries of the cores and windings are similar to the planar transformers known heretofore in radio frequency apparatus and thus not described in detail. However, the implementation revealed here is unique in that some windings are meant to be withdrawn, as shown for example in FIG. 5. It should be noted that the bulk of the core 20 stays with the portion 120, while only a magnetic gap filter insert 162 moves with portion 140.

Figure 9:
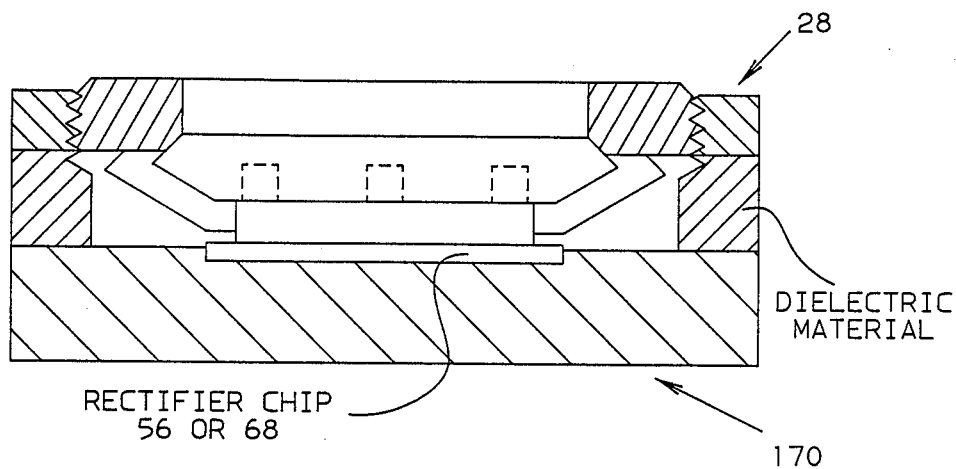
FIG. 9 shows a detail of rectifier chip installation which is positioned as indicated in FIG. 7.

During the operation of a forward converter, such as shown schematically in FIG. 1, it is necessary to quickly commutate the inductor 62, 64, 66, 104 currents (approximately the respective output currents) from the freewheeling diodes 68, 70, 72, 78 to the secondary windings 28, 30, 32, 34 and rectifying diodes 56, 58, 60, 102. This transfer of current occurs when the switch 38 turns on. A similar commutation of the current from the rectifying diodes back to free-wheeling diodes occurs when the switch 38 turns off. Any inductance in the circuit loop of any secondary winding and diode pair, such as circuit loop 164 in FIGS. 3 and 8, increases these commutate times. Such inductance may be due to actual lead inductance or to the leakage inductance (lack of perfect magnetic coupling) of the respective power transformer. By positioning the diodes 56, 58 inside a planar winding 28, as illustrated in FIG. 7, the inductance of this circuit loop can be minimized. In this embodiment, the diodes are implemented as single chip devices, as shown for example in FIG. 9. Further description of this kind of device is given in an article entitled "Low Inductance Chip Connector for Power Rectifiers" published in the IBM Technical Disclosure Bulleting, Vol. 29, No. 3 (August, 1986) pages 1071-1072.

Alternatively, the diodes could be implemented as groups of parallel diode pellets. The presence of the primary current in a uniformly spaced spiral primary winding 12 encourages a uniform "sheet" current in the secondary 28. Where parallel groups of diode pellets are used, they would be arranged in a row transverse to the current direction so that there would be equal current sharing among the diode pellets, during commutate times and when the switch 38 is on. The diode chips or pellets can be cooled through a cold plate or heatsink mounted on the rectified DC conductor 170. For simplicity of illustration of the other structure, these cooling features are not shown. They can always be arranged so that the cold plate cools either a ground node or a DC node, so that maximum cooling capability can be obtained without compromising switching behavior with large capacitances to an electrically grounded heatsink.

The bulk of the filter components on the function card 160 is held to a minimum by using the zero-ripple coupled inductor concepts discussed in the aforecited U.S. Pat. No. 4,703,409. The inductor core 150 and the one winding 104 with ripple are fixed in position; the zero-ripple windings 62, 64, 66 carrying load current are attached to the card. Thus, the secondary portion 140 on functional card connects to the power supply base portion 120 through the magnetic flux links of cores 20, 22, 24, and 150. Any necessary control/regulation signal such as on line 42 is fed back from the load (functional card) to the power supply via conventional connectors or via a small signal version of the flux link connectors described above.

A direct approach toward implementing a minimum ripple coupled output filter inductor in accordance with the general teachings of the aforecited U.S. Pat. No. 4,703,409 is to place all windings around a common flux path. The induced voltage requirement for the zero-ripple windings is satisfied by adjusting the number of turns in the windings. The component physically resembles a conventional transformer and uses standard bobbins and cores.

However, in such case, the length of any turn in any winding encircles the common core path, which must be large enough to handle the d.c. flux from the sum of all the amp-turns of all the windings. The resulting d.c. resistance of the winding can be a problem, particularly in high-current outputs. Further, discrete turns around a common core can present a nearest turn number problem, forcing acceptance of "nearly correct" induced voltage in the zero-ripple windings.

Figure 11:
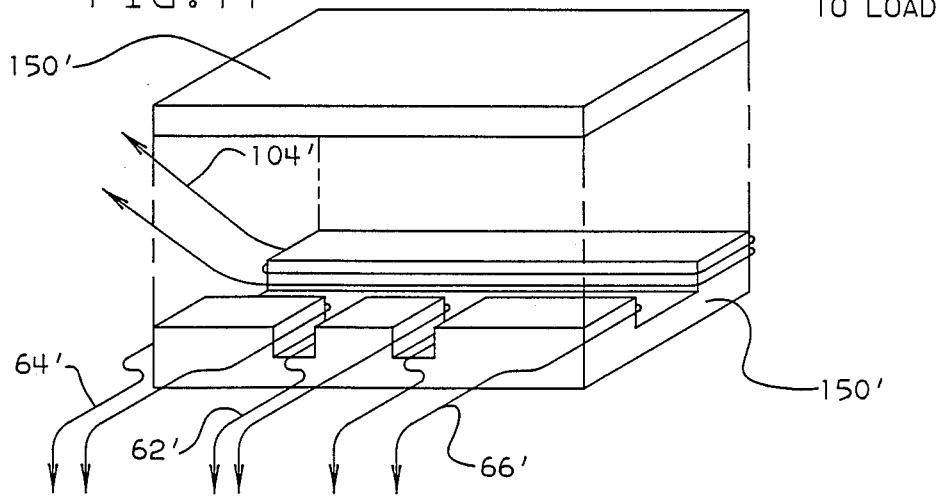
FIG. 11 shows an electrical and mechanical schematic which corresponds to the practical structure shown in FIG. 10 but is included to illustrate operating principles thereof.
Figure 10:
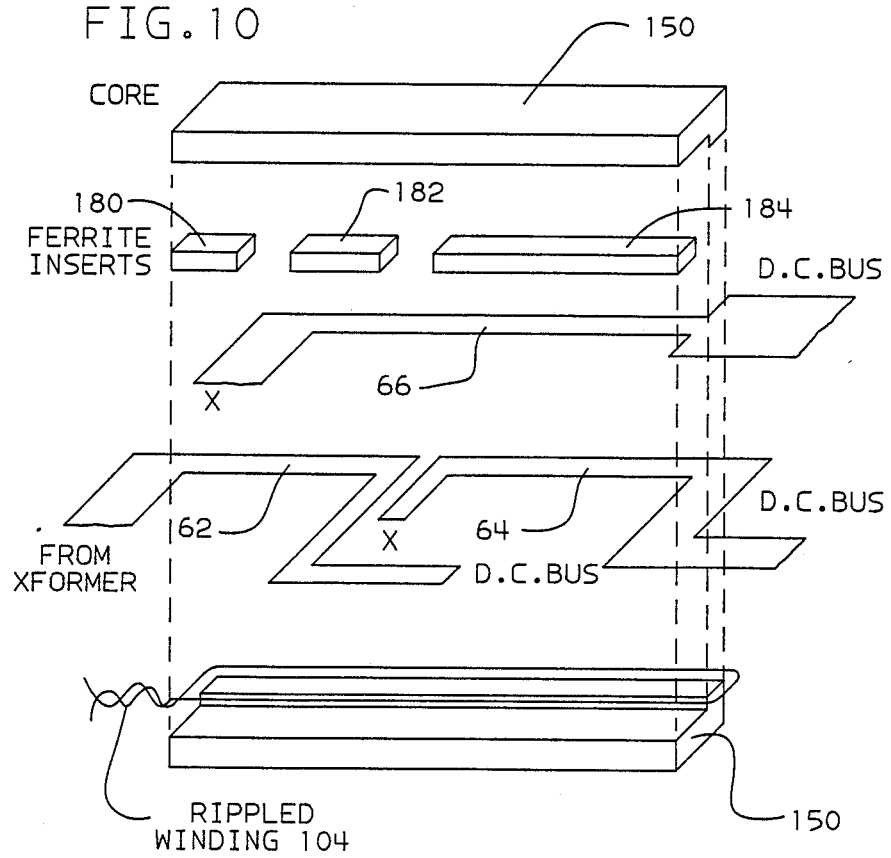
FIG. 10 is an exploded view illustrating the filter inductor structure of FIG. 4.

In principle, only the one winding with ripple must encircle the sum of the flux from all windings. Further, the induced voltage requirement for the zero-ripple windings can be satisfied with, in the limit, one turn per winding—provided that one turn encircles the required amount of a.c. flux from the one winding with ripple. Such considerations lead to a multiple path core geometry, as shown in FIG. 10. In the structure shown, the core 150 embraces the inductor windings 62, 64, 66 and 104, and is completed by magnetic gap filler inserts 180, 182, 184 carried by the movable winding structure 140. The simplicity of the zero-ripple windings and planar geometry of the multiple path core 15 makes this structure particularly attractive for multi-output supplies. FIG. 11 shows schematically the operational relationships of the parts shown in FIG. 10. The ratios of the cross-sectional areas of the core portions, and thus the flux portions, linked by the windings, determine the relative contribution of the effect of the ripple bearing winding 104 on each of the ripple-free windings 62, 64, 66. The number of turns or the respective primaries 12, 14, 16 determines the voltages induced in the respective single turn secondaries, and the ratios of the flux portions linked by the single turn inductors 62, 64, 66 correspond to the ratios of those induced voltages in accordance with the general teachings of the aforesaid U.S. Pat. No. 4,703,409. The turns, voltages and core areas shown in the drawings illustrate quantitative relationships in a general way, but are not intended to be to scale.

Figure 4:
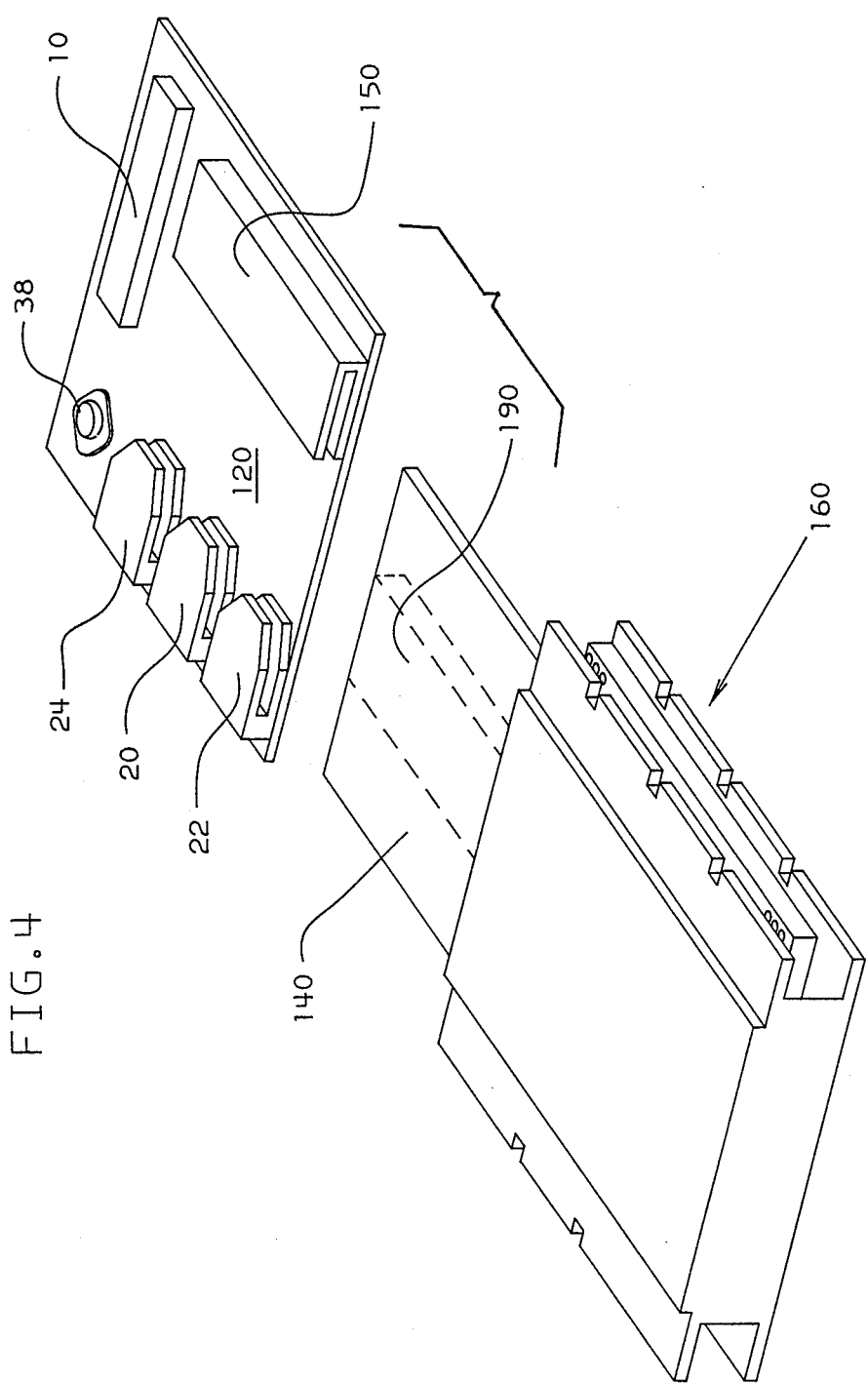
FIG. 4 shows one preferred embodiment of the invention in which the portions of core structures carried by the card, powered by the system of the invention, are minimized.

The magnetic structures (transformers and inductors) illustrated in FIG. 4 perform the function of a high current power connector without any ohmic contact required. This arrangement involves inserting a tongue-like extension containing conductors (FIG. 5) or conductors and ferrite insert (FIG. 10) into a slot in the fixed ferrite cores.

Figure 12:
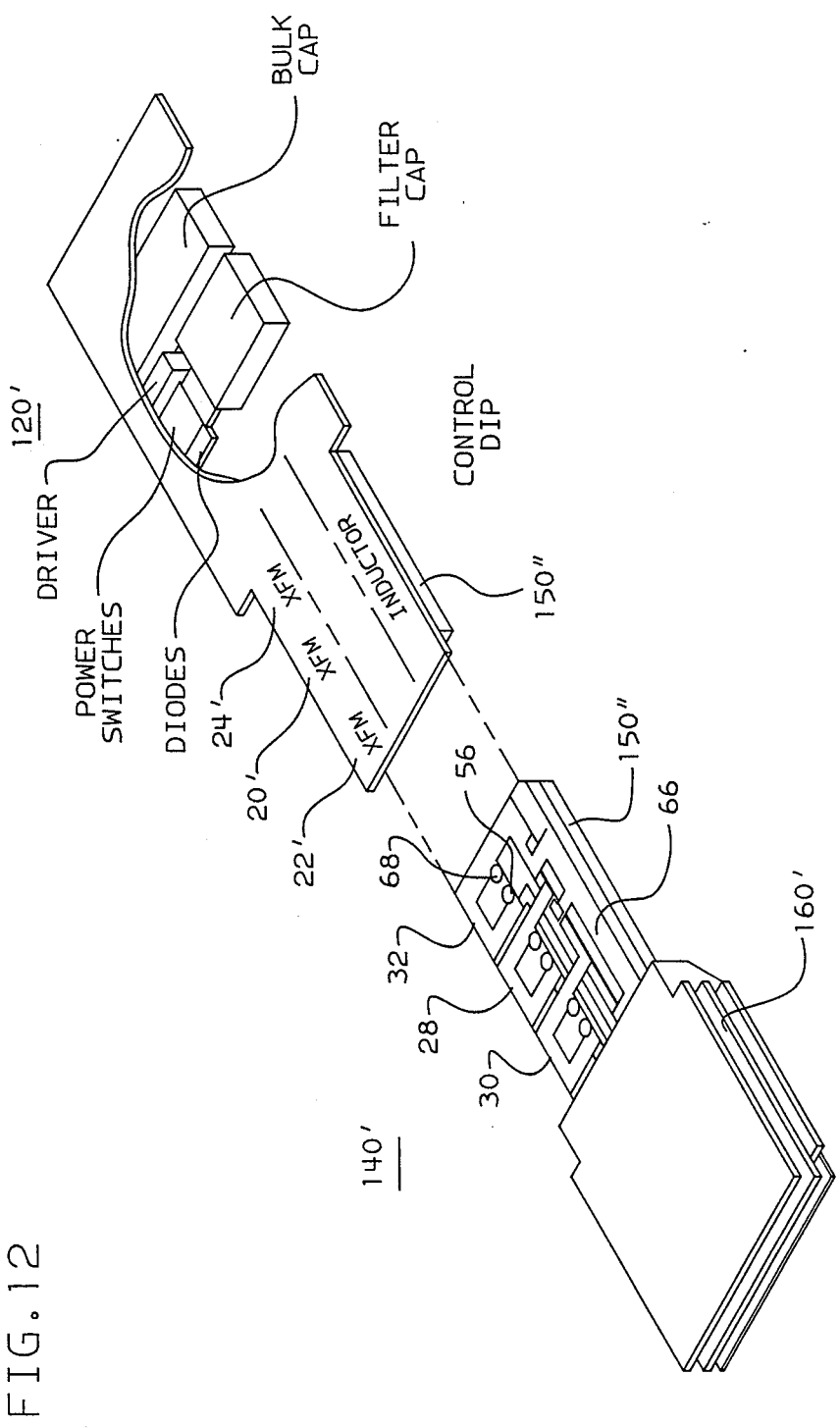
FIG. 12 shows another embodiment of the invention in which the core structures are divided between the machine frame and card elements to engage each other in lapped fashion instead of tongue-and-groove fashion.

The magnetic structure of FIG. 12 performs the same function; i.e., it is a transformer or inductor which serves as an electrical connector with no ohmic contact. However, the mechanical arrangement is simpler. As illustrated in FIG. 12, the lower half of the cores 20', 22', 24', 150" remain with the secondary structures 28, 30, 32, 62, 64, 66, and the associated diodes 56, 58, 60, 68, 70, 72 as part of the card structure 140'. The upper halves of the cores 20', 22', 24', 150" remain with their primary windings 12, 14, 16 as part of primary structure 120'. When withdrawn, each ferrite portion is a block with flat mating surfaces and winding area, as shown in FIG. 12. The flat surfaces, mating in a lap joint, eliminate difficulties associated with constructing the ferrite core with a slot and aligning the tongue for insertion. Further, having exposed planar winding areas creates the potential for fabrication of conductors for windings, wiring, and interconnections by deposition or similar techniques with minimum assembly or stacking of conductor layers.

Figure 13:
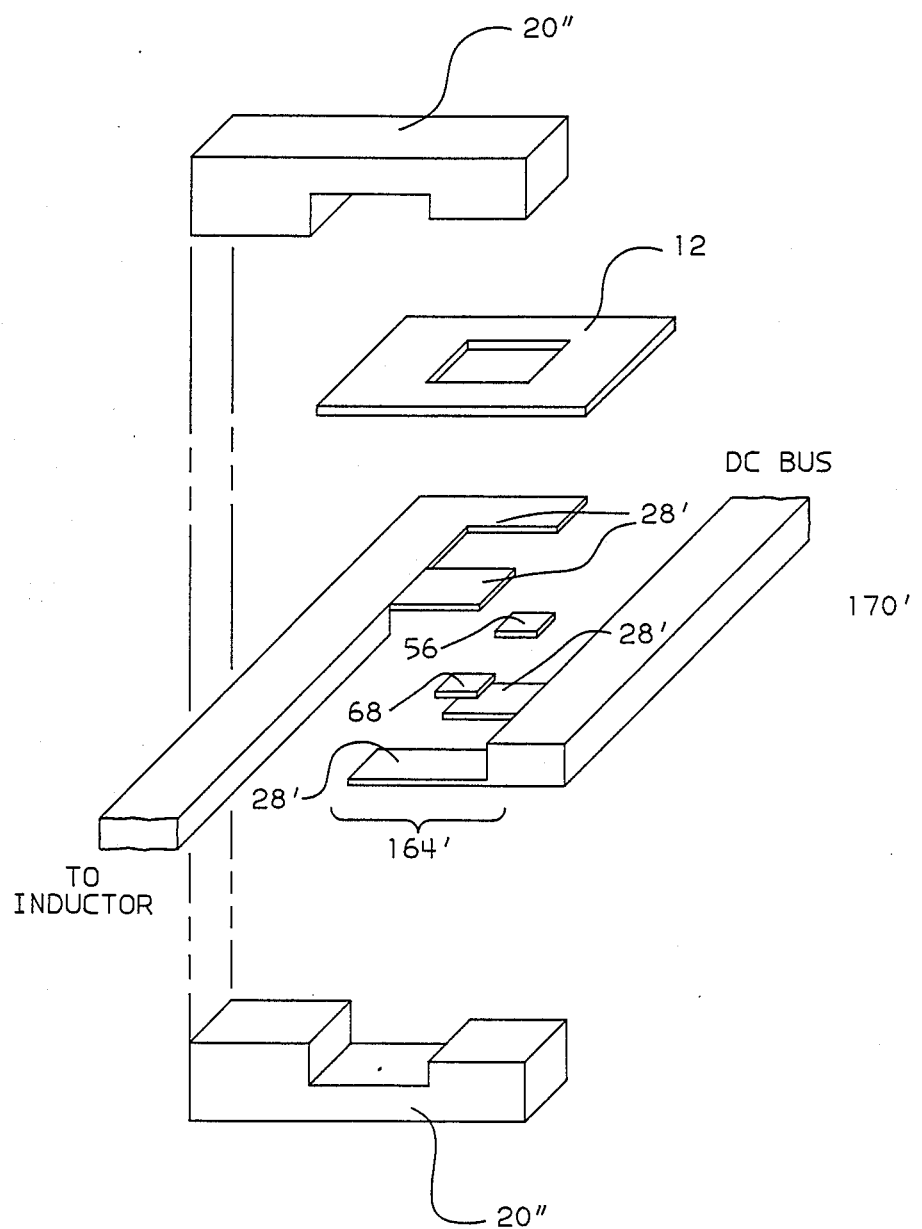
FIG. 13 shows an alternative embodiment of the general subject matter of FIG. 7, but wherein the diodes are positioned differently.

An alternate arrangement of FIG. 7 is shown in FIG. 13. Here, the rectifier chips or pellets 56, 68 are positioned on opposite sides of the core. The secondary structure 28' consists of one conductor which connects the inductor bus to the top of the chips, and another conductor which connects to the bottom of the chips and forms the dc bus 170'. Together, these conductors provide a diode-diode conduction loop 164' which has little deviation from the ideal planar loop represented by the primary winding 12, and thus this arrangement facilitates the commutating action of the diodes in the same manner as the arrangement in FIG. 7. Such placement of the chips may provide mechanical or cooling advantages compared to FIG. 7, but would be equivalent electrically.

The above described embodiments of the invention provide compact and efficient structures for coupling, magnetically and without electrical connection, a power source to a plurality of loads. While certain embodiments have been described in detail, it will be apparent that the invention is not limited thereto but can be otherwise embodied within the spirit of the invention and the scope of the appended claims.

What is claimed is:

1. A power system comprising a first structure including a primary transformer winding and a driving filter winding and a separate card having a planar transformer secondary winding mounted thereon to provide power to said card by magnetic coupling to said primary transformer winding, said card having a planar driven filter winding mounted thereon to provide inductive filtering of the power on said card by magnetic coupling to said driving filter winding, said card being overlappingly positioned with said secondary winding and said driven filter winding adjacent corresponding primary transformer winding and driving filter winding of said first structure to complete the transformer and filter.

2. The combination claimed in claim 1 wherein said card is inserted into complementary parts of the primary transformer winding and driving filter winding of the first structure.

3. A power system according to claim 2 wherein said card comprises a ferromagnetic insert imbedded in said planar transformer secondary in position to complete said magnetic circuit when said card is inserted.

4. A power system comprising first structure including a primary transformer winding and a driving filter winding and a separate card having a plurality of planar transformer secondary windings mounted thereon to provide power to said card by magnetic coupling, said card carrying planar driven filter windings magnetically coupled to said driving filter winding of said first structure when overlappingly positioned, said card carries plural output circuits, each having imposed on it an a.c. ripple voltage by said secondary winding and including a driven filter inductor winding, of one turn, magnetically associated with said driving filter winding by a magnetic core having a main portions carrying said driving filter winding and a plural magnetic flux path portion carrying said driven filter windings, with the cross-sectional areas of the paths being so related that single turn driven filter windings encircling one or more of the paths can have generated in them, by the flux they encircle, a.c. potentials which are a function of a.c. ripple current carried by the driving winding, but which differ between themselves in proportion to the different ripple a.c. potentials imposed on them.

5. A power system in accordance with claim 4 where said card includes planar rectifier and free-wheeling diode components within the secondary winding whereby inductance in the circuit loop formed by said secondary winding is minimized and commutating action of the diodes is facilitated.

6. A power supply circuit for producing a plurality of outputs comprising:
   a voltage source;
   transformer means having primary input coil means connected to said voltage source and secondary output coil means;
   output stage means of a first class connected to said secondary output coil means and including an inductor winding carrying ripple current, and
   a plurality of output stages of a second class for providing a plurality of outputs, each of said plurality of output stages of said second class connected to said secondary output coil means, each of said plurality of output stages of said second class including a single turn inductor winding, each inductor winding of said second class being magnetically coupled to the inductor winding of said output stage means of said first class,
   said secondary output coil means imposing proportionally related voltages on said output stages,
   said inductor windings sharing a common core structure, said common core structure defining multiple flux paths linked by said inductor windings of said second class, said core structure having cross-sectional areas of said flux paths chosen such that the induced open-circuit voltages across each inductor winding included in said output stages of said second class, when the inductor windings included in said plurality of output stages of said second class are disconnected from their respective output stages, are approximately identical to the imposed operating voltages thereon when the inductor windings included in said plurality of output stages of said second class are connected to their respective output stages;
   the ripple current through the inductor windings included in said plurality of output stages of said second class being much lower than said ripple current in said inductor winding of said first class.

7. A power system having plural d.c. output circuits, each said output circuit having imposed on it an a.c. ripple voltage and including a driven filter inductor winding of one turn magnetically associated with a driving filter winding by a common magnetic core having a main portion carrying the driving winding and a plural magnetic flux path portion carrying the driven filter windings, with the cross-sectional areas of the paths being so related that single turn windings encircling one or more of the paths can have generated in them, by the flux they encircle, a.c. potentials which are a function of ripple current carried by the driving winding, but which differ between themselves in proportion to the differing ripple potentials imposed on them.

8. A power system comprising a power transformer having a secondary circuit structure including planar rectifier and free-wheeling diode components within a secondary winding of said transformer whereby inductance in the circuit loop formed by said secondary winding is minimized and commutating action of the diodes is facilitated.

* * * * *